(12) United States Patent
Huh et al.

(10) Patent No.: US 9,459,897 B2
(45) Date of Patent: Oct. 4, 2016

(54) SYSTEM AND METHOD FOR PROVIDING DATA ANALYSIS SERVICE IN CLOUD ENVIRONMENT

(71) Applicant: SAMSUNG SDS CO., LTD., Seoul (KR)

(72) Inventors: Je Min Huh, Seoul (KR); Jin Cheol Kim, Yongin-si (KR); Jae Young Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 350 days.

(21) Appl. No.: 14/060,962

(22) Filed: Oct. 23, 2013

(65) Prior Publication Data

US 2014/0123142 A1 May 1, 2014

(30) Foreign Application Priority Data

Oct. 31, 2012 (KR) .................. 10-2012-0121902

(51) Int. Cl.
*G06F 9/46* (2006.01)
*G06F 9/455* (2006.01)
*G06F 9/50* (2006.01)

(52) U.S. Cl.
CPC ......... *G06F 9/45533* (2013.01); *G06F 9/5072* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 2010/0199037 A1 | 8/2010 | Umbehocker et al. | |
| 2011/0258481 A1 | 10/2011 | Kern | |
| 2011/0296000 A1* | 12/2011 | Ferris | G06Q 10/00 709/224 |
| 2012/0324069 A1* | 12/2012 | Nori | G06F 9/5066 709/222 |
| 2013/0132967 A1* | 5/2013 | Soundararajan | G06F 9/5066 718/104 |

FOREIGN PATENT DOCUMENTS

| | | |
|---|---|---|
| KR | 1020090018905 A | 2/2009 |
| KR | 10-2012-0045322 A | 5/2012 |
| WO | 2012/042509 A1 | 4/2012 |

OTHER PUBLICATIONS

Communication dated Jul. 31, 2014, issued by the Korean Intellectual Property Office in counterpart Korean Application No. 10-2012-0121902.
International Search Report for PCT/KR2013/009351 dated Feb. 3, 2014 [PCT/ISA/210].

* cited by examiner

*Primary Examiner* — Wissam Rashid
(74) *Attorney, Agent, or Firm* — Sughrue Mion, PLLC

(57) ABSTRACT

The present invention relates to a system and a method for providing a data analysis service in a cloud environment which does not need to transmit data to an analysis section from a file storage section when providing an analysis service about big data. According to the present invention, it is not needed to specifically move files when analyzing big data, by using the storage section resource in a virtual machine in a cloud environment as storages, and accordingly, the analysis time can be considerably reduced.

19 Claims, 11 Drawing Sheets

SYSTEM AND METHOD FOR PROVIDING DATA ANALYSIS SERVICE IN CLOUD ENVIRONMENT

CROSS-REFERENCE TO RELATED APPLICATION

This application claims priority from Korean Patent Application No. 10-2012-0121902 filed on Oct. 31, 2012 in the Korean Intellectual Property Office, and all the benefits accruing therefrom under 35 U.S.C. 119, the contents of which in its entirety are herein incorporated by reference.

TECHNICAL FIELD

The exemplary embodiments relate to a system and a method for providing a data analysis service in a cloud environment, and more particularly, to a system and a method for providing a data analysis service in a cloud environment which does not need to transmit data to an analysis section from a file storage section when providing an analysis service about big data.

BACKGROUND

With the advent of the hypervisor technology, it became possible to generate a plurality of virtual machines in one physical server and to provide a plurality of virtual servers. Such technology may be available for the field of cloud computing, for example. For example, a user who uses a cloud computing service can reduce a server operation cost by establishing a virtual machine with a resource assigned for his/her demand in a physical server device provided by the service operator.

In a server system providing the technology of providing a hypervisor-based virtual machine, the hypervisor manages resources obtained by virtualizing hardware (H/W) and performs provisioning on the virtual machine, using some of the resources. Provisioning of a virtual machine may mean connecting the resource assigned to the virtual machine to a virtual machine instance.

In order to analyze big data in the virtual machine instance generated, as described above, it is required to purchase system infra resources such as a server and a network and to configure and operate a complicated distributed computing system.

Recently, according to a user on-demand service such as an elastic map reduce (EMR) service of Amazon, the data analyzers can concentrate on data analysis and achieve the result of the data analysis within a short time by receiving a system for analyzing big data as a service every time they need the system, even without specific costs and efforts.

SUMMARY

However, it is required to transmit big data to an analysis server composed of a virtual machine from a physical storage in the process of analyzing big data in the related art, and in this case, the transmission takes a long time and generates many network traffics in the center.

That is, as exemplarily illustrated in FIG. 1, a storage 10 may be implemented by a physical section such as a file server or a webhard service and an analysis solution for analyzing big data may be provided in the environment of a virtual cloud 50. Accordingly, in order to analyze big data stored in his/her storage 10, a user has to copy the big data to his/her client device or move the big data to a file system of a cloud server with an analysis solution 30, for example, to a hadoop file system (HDFS) 20 and then analyze the big data.

An object of the present invention designed on the basis of the problems is to provide a system and a method for providing an analysis service for analyzing big data in response to a demand of a user, using cloud resources, in which files are transmitted as little as possible between an analysis server and a storage.

Another object of the present invention is to provide a system and a method which can rapidly analyze data with high extendibility, by providing a plurality of clustered virtual machines to a storage section.

Yet another object of the present invention is to provide a system and a method which can scale up a virtual machine, in order to be able to increase performance in analyzing in addition to providing a plurality of clustered virtual machines to a storage section.

The objects of the present invention are not limited to those described above and other objects not stated herein may be clearly understood by those skilled in the art from the following description.

According to the present invention, it is not needed to specifically move files when analyzing big data, by using the storage section resource in a virtual machine in a cloud environment as storages, and accordingly, the analysis time can be considerably reduced.

Further, rapid data analysis is possible by assigning a plurality of virtual machines as storages and scaling up the CPU and memory resources of the virtual machines to increase the calculation speed of big data in analyzing.

Further, since scale-up of the resource of the existing virtual machine that takes a relatively short time is performed instead of scale-out that generates a specific virtual machine in analysis of big data, it is possible to save the work time as much as the time for generating an additional virtual machine.

Further, since a specific virtual machine is not generated, it is not needed to cluster again additionally generated virtual machines together, and thus resources can be reduced.

In the first aspect of the present invention, there is provided A system for providing a data analysis service in a cloud environment, the system comprising: a plurality of first virtual machines that is generated from cloud resources and includes a storage storing data and a storage node managing input/output of the data for the storage; a virtual cluster manager that clusters the first virtual machines together; a user storage manager that manages the information on the storage; a cloud resource manager that manages the cloud resources; and a user analysis resource manager that generates a second virtual machine including an analysis node for analyzing the data stored in the first virtual machines, in response to a request for analyzing data from a user of the first virtual machines, wherein the second virtual machine accesses and analyzes the data.

In the second aspect of the present invention, there is provided A system for providing a data analysis service in a cloud environment, the system comprising: a plurality of first virtual machines that is generated from cloud resources and includes a storage storing data and a storage node managing input/output of the data for the storage; a virtual cluster manager that clusters the first virtual machines together; a user storage manager that manages the information on the storage; a cloud resource manager that manages the cloud resources; and a user analysis resource manager that generates an analysis node for analyzing the data stored in the first virtual machines, in the first virtual machines, in response to a request for analyzing data from a user of the first virtual machines, wherein the analysis node accesses and analyzes the data, and the cloud resource manager scales-up some resources in the first virtual machines before the analysis node is generated in the first virtual machines.

In the third aspect of the present invention, there is provided A method of providing a data analysis service in a cloud environment, the method comprising: receiving a request for generating a plurality of first virtual machines from a user; generating a storage by using the first virtual machines; clustering the first virtual machines together; storing data received from the user to the storage; receiving a request for analyzing the data; generating a second virtual machine including an analysis node for analyzing the data; and accessing and analyzing the data by means of the second virtual machine.

In the forth aspect of the present invention, there is provided A method of providing a data analysis service in a cloud environment, the method comprising: receiving a request for generating a plurality of virtual machines from a user; generating a storage by using the first virtual machines; clustering the first virtual machines together; storing data received from the user to the storage; receiving a request for analyzing the data; analyzing the resources of the first virtual machines; scaling up the resources of the first virtual machine, when the resources are at a predetermined value or less; generating an analysis node for analyzing the data in the first virtual machines; and accessing and analyzing the data by means of the analysis node.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE EMBODIMENTS

Figure 1:
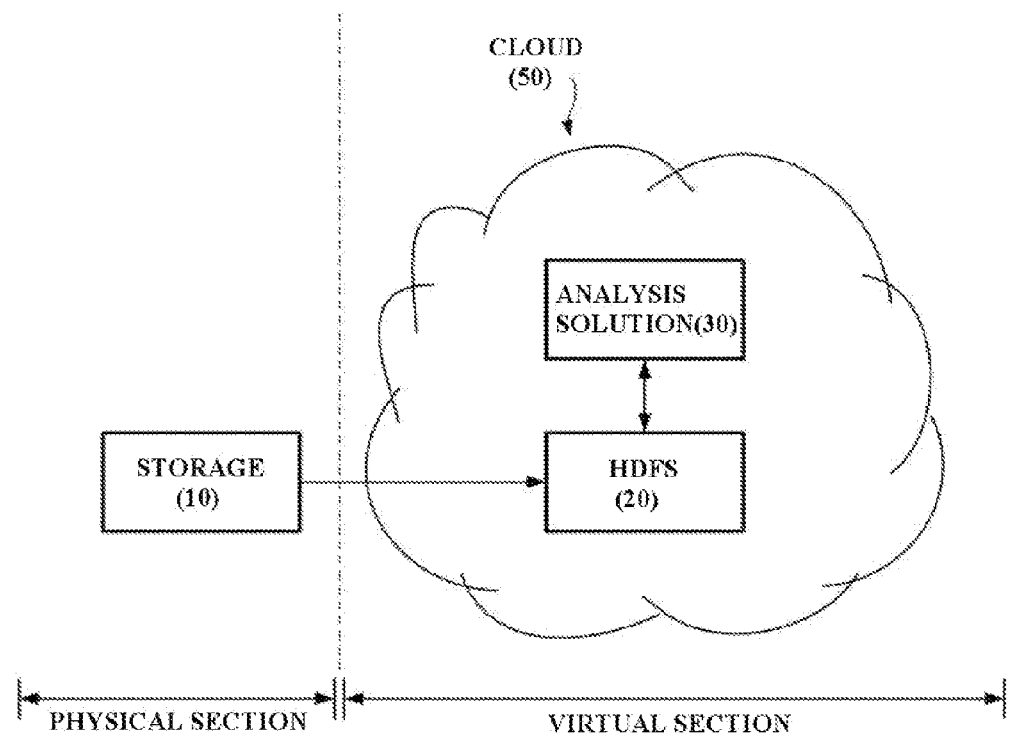
FIG. 1 is a diagram illustrating a system for providing a data analysis service in a cloud environment of the related art.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, the configuration of a system for providing a data analysis service in a cloud environment according to an embodiment of the present invention will be described with reference to the drawings.

Figure 2:
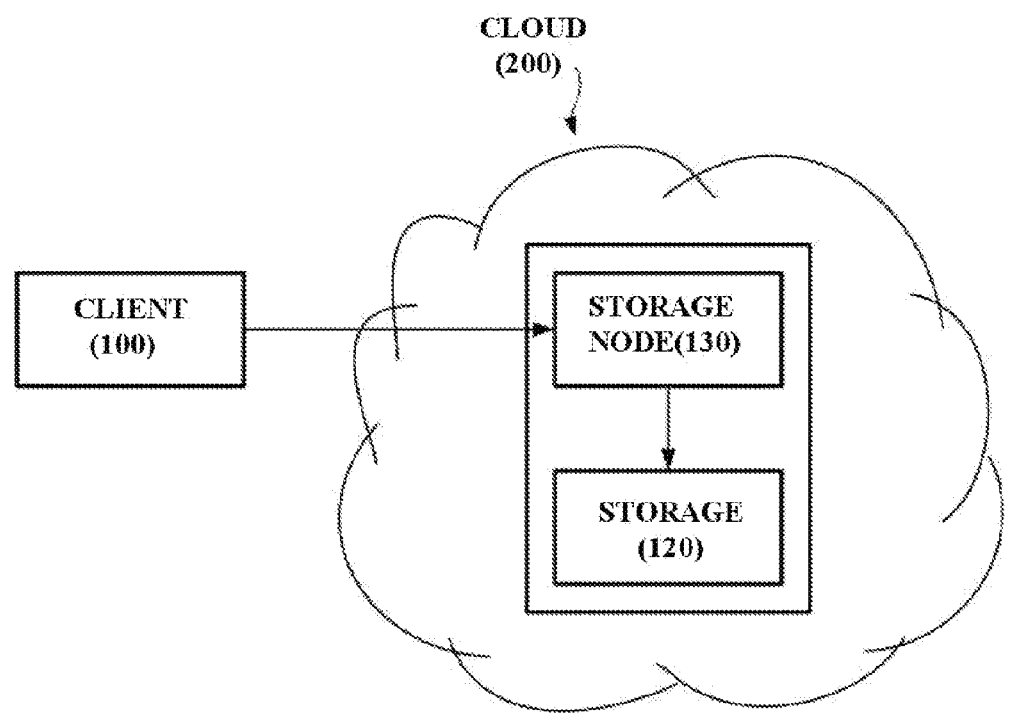
FIG. 2 is a schematic diagram illustrating a system for providing a data analysis service in a cloud environment according to an embodiment of the present invention.
Figure 3:
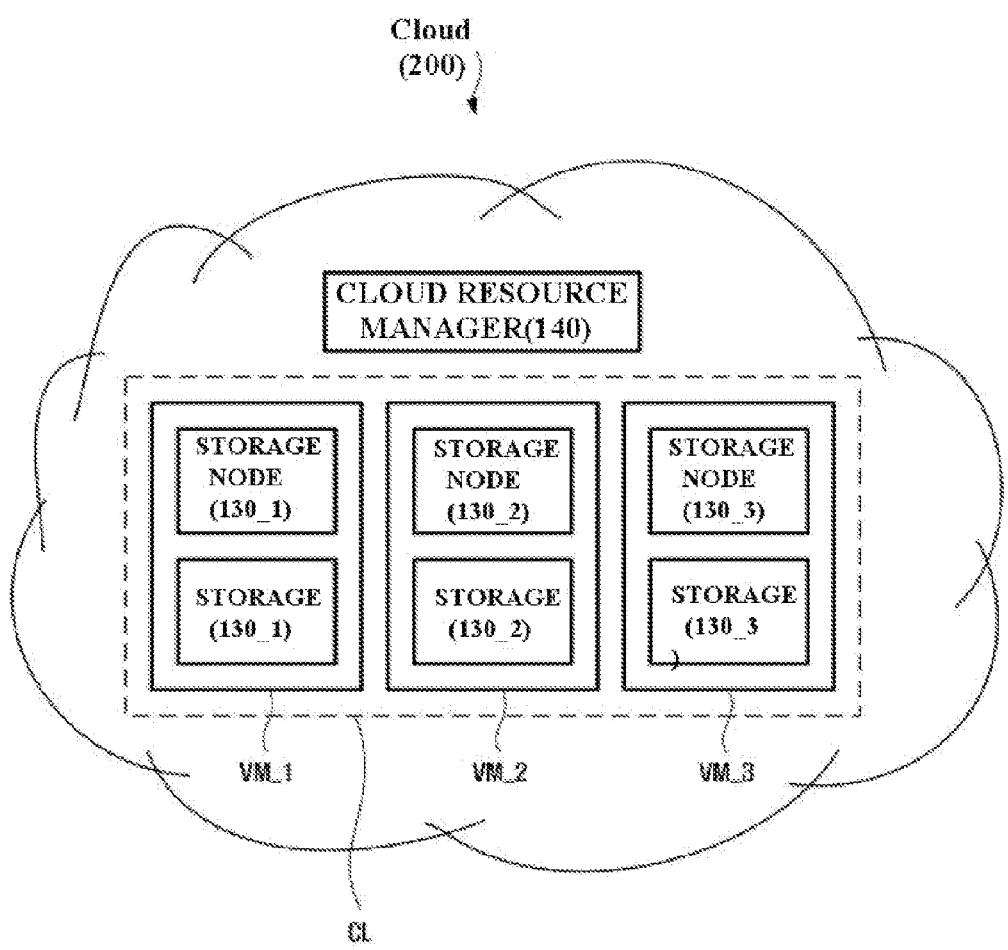
FIG. 3 is a diagram illustrating a detailed configuration in the cloud environment of FIG. 2.
Figure 4:
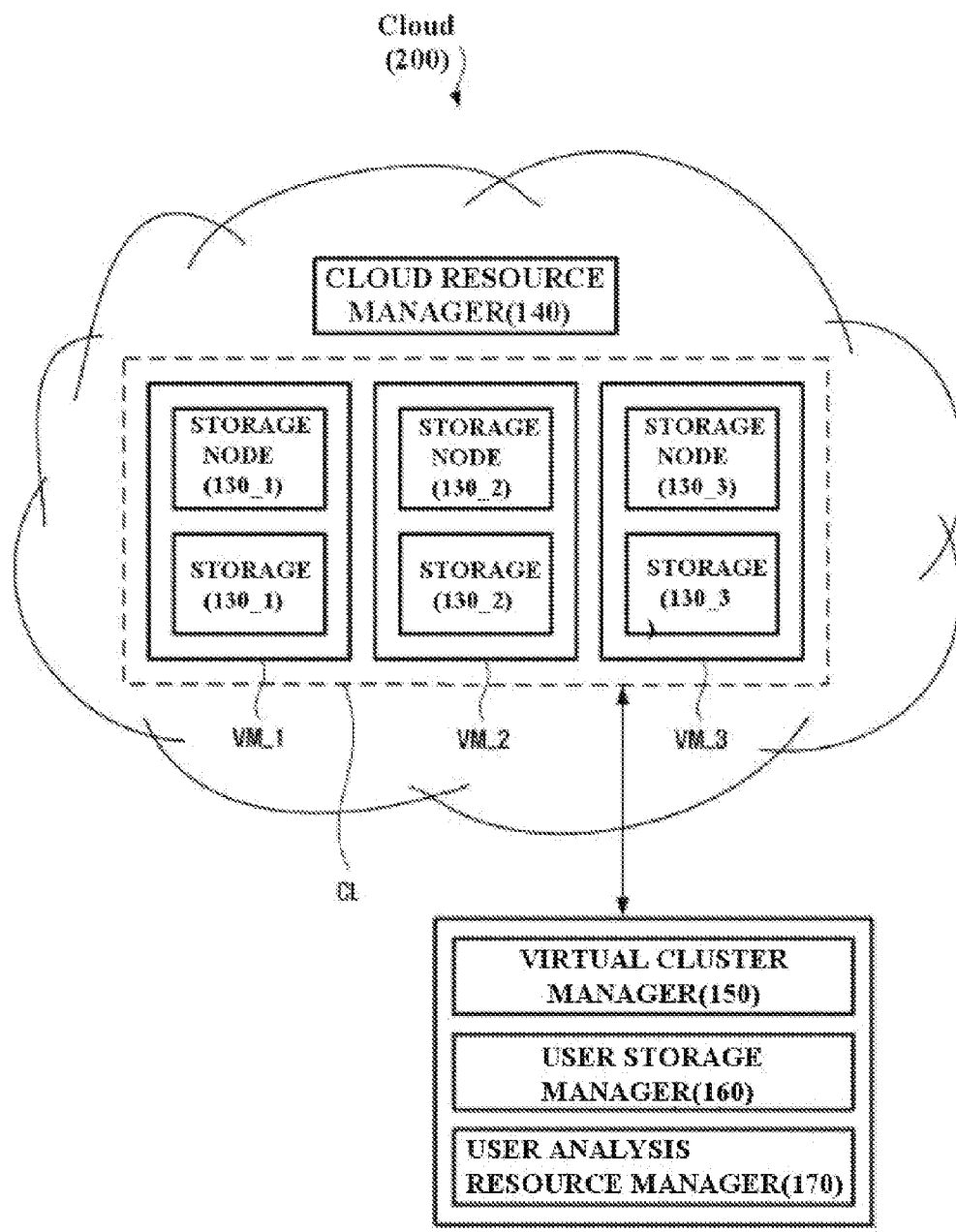
FIGS. 4 and 5 are diagrams illustrating a configuration managing the cloud environment of FIG. 3.
Figure 5:
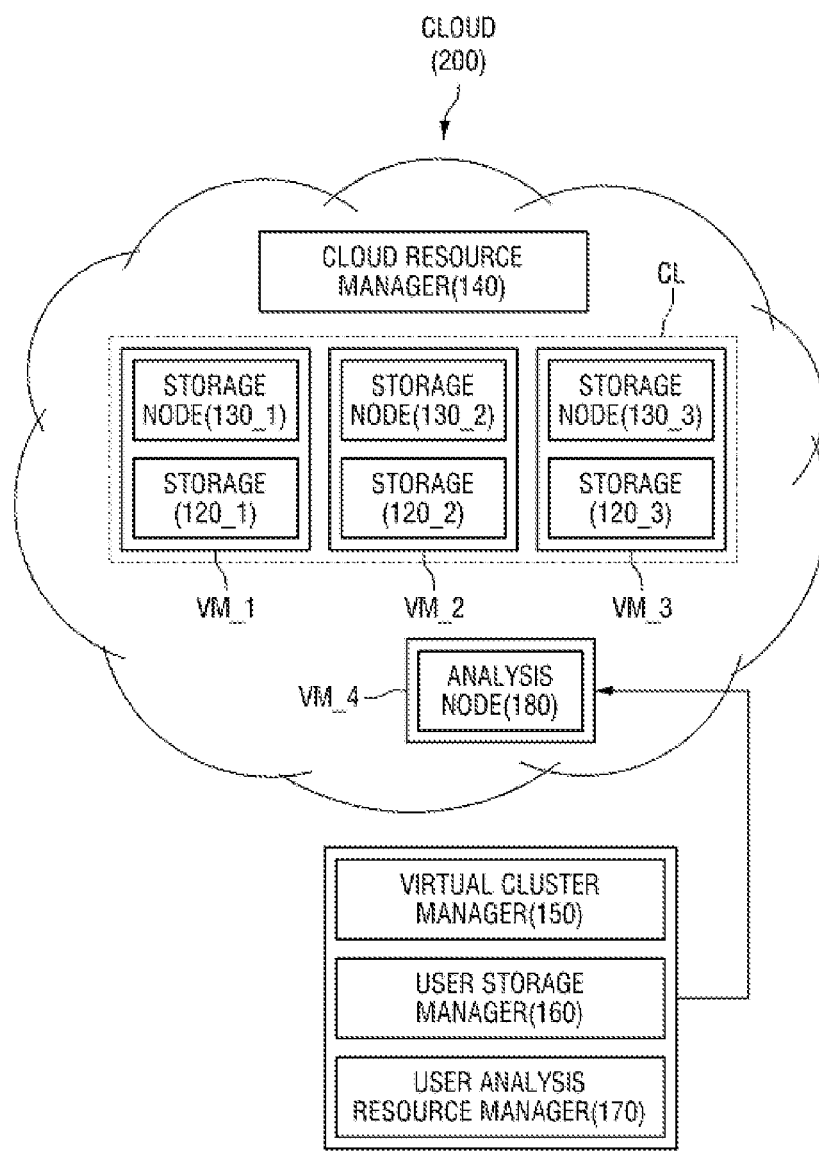
Figure 6:
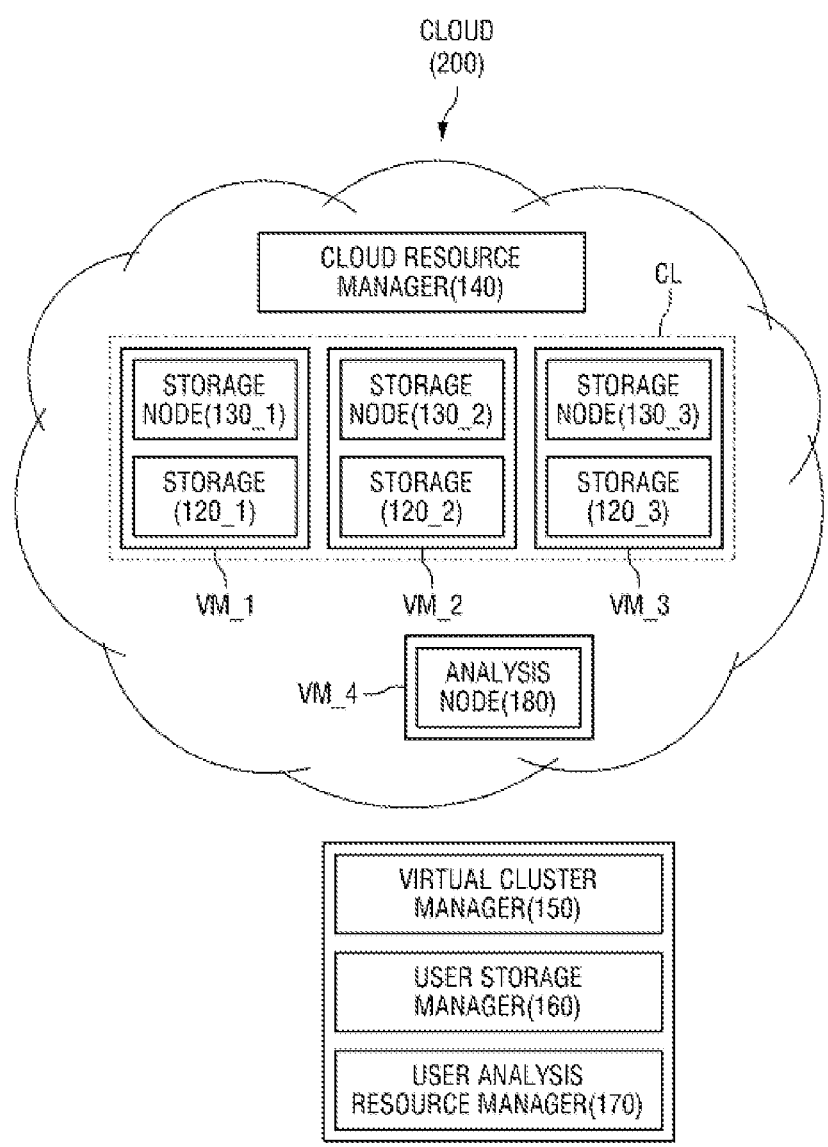
FIG. 6 is a diagram illustrating a configuration for analyzing data in the cloud environment of FIG. 3.

FIG. 2 is a schematic diagram illustrating a system for providing a data analysis service in a cloud environment according to an embodiment of the present invention, FIG. 3 is a diagram illustrating a detailed configuration in the cloud environment of FIG. 2, FIGS. 4 and 5 are diagrams illustrating a configuration managing the cloud environment of FIG. 3, and FIG. 6 is a diagram illustrating a configuration for analyzing data in the cloud environment of FIG. 3.

As illustrated in FIG. 2, a system for providing a data analysis service in a cloud environment according to the embodiment may include a client 100 that connects to a cloud environment 200, and a storage 120 and a storage node 130 in a client environment.

The client 100, for example which is a device including a wire or wireless communication module, may be a device that performs predetermined works in connection with the cloud environment 200.

The type of the client 100 is not limited, and for example, the client 100 includes a common desktop PC, or mobile terminals, such as a cellular phone, a personal communications services (PCS) phone, and a synchronous/non-synchronous type international mobile telecommunication-2000 (IMT-2000), which is portable and can communicate with a cloud server providing the cloud environment 200 through wireless internet or portable internet, and also the client 100 may be a palm personal computer (palm PC), a personal digital assistant (PDA), a smart phone, a wireless application protocol phone (WAP phone), a mobile-playstation device, a laptop computer, a tablet PC, and a navigation system.

The network connecting the client 100 with the cloud 200 may be wire or wireless internet, or a core network integrated with a wire public network, a wireless mobile network, or portable internet, or the network connecting the client 100 may mean an open computer network structure providing a TCP/IP protocol and various services in the higher class, that is, hyper text transfer protocol (HTTP), Telnet, file transfer protocol (FTP), domain name system (DNS), and simple mail transfer protocol (SMTP).

The environment of the cloud 200 may mean a set of physical servers for providing a plurality of cloud services or may mean an environment where a plurality of virtual machines implemented on a physical server is provided.

A plurality of virtual machines may be generated on the cloud 200 and each of the virtual machines may include the storage 120 section for providing a storage service and the storage node 130 for managing the storage 120.

The virtual machines may configure a predetermined virtual cluster by being clustered so that a user who connects to the virtual machines through the client 100 and is provided with a cloud service such as the storage service is recognized as using one storage section.

The storage 120 may be different from the existing physical storages, may be a storage section virtually assigned by a hypervisor (not illustrated) provided in a physical machine where a virtual machine is generated, and may be generated or deleted by the hypervisor. The storage 120 may be a virtual storage space, and when a user transmits data through the client 100 device, the storage 120 may perform a role keeping the data. The data stored in the storage 120 by a user may be stored on a resource of the virtual machine where the storage 120 is disposed and the resource of the physical machine may be converted and provided in a type of the resource of the virtual machine by the hypervisor.

The storage node 130 manages the data stored in the storage 120, receives the data transmitted from the client 100, and records the received data on the storage 120. The storage node 130 may be included in a virtual machine and may be disposed in the same virtual machine as the virtual machine having the storage 120, but is not limited thereto and the storage node 130 may be disposed in other virtual machines, not the virtual machine having the storage 120.

Further, one storage node 130 can manage input/output and change of data for one storage 120, but the storage node 130 may simultaneously manage a plurality of storages 120. For example, data received by one storage node 130 may be distributed and stored in a plurality of storages 120.

Referring to FIG. 3, a plurality of virtual machines VM_1, VM_2, and VM_3 may be generated in the cloud 200 system and may be managed by a cloud resource manager 140 that manages the resources of the cloud 200. The cloud resource manager 140 may function as a hypervisor, and may be generated individually from a hypervisor, monitor all of the resources of the cloud 200, and manage and assign necessary resources for each of the virtual machines.

Although the cloud resource manager 140 may be a commercial or non-commercial solution that manages of cloud resources in some other embodiments, for example, Openstack Nova, CloudStack, and VMware Vcloud, but it is not limited thereto.

Although the virtual machines VM_1, VM_2, and VM_3 may be the same in specification type, the virtual machines are not limited thereto and the types of virtual machines requested to be generated by the client 100 may be various. Consumers who transmit a generating request for the virtual machines in the cloud 200 may designate a desired resource when requesting a virtual machine.

For example, the first consumer may request a virtual machine having a 1 TB storage, an 8 GB memory, and four cores and the second consumer may request a virtual machine having a 2 TB storage, a 16 GB memory, and two cores. In this case, the two virtual machines may be different in specification type.

Further, the client 100 may select one of predetermined specification types in some other embodiments. For example, when the specification type A is composed of a 10 TB storage, an 8 GB memory, and two cores and the specification type B is composed of a 2 TB storage, a 64 GB memory, and eight cores, a consumer who wants to process big data would select a virtual machine with the specification type A and a consumer who wants fast calculating performance would select a virtual machine with the specification type B. The cloud resource manager 140 may provide the client 100 with the virtual machines VM_1, VM_2, and VM_3 by performing provisioning on the virtual machine according to a predetermined specification type.

The virtual machines may each include the storage 120 and the storage node 130, as described above, and the client 100 may store desired data in the storages 120 in accordance with common examples and freely load and read the stored data.

The virtual machines VM_1, VM_2, and VM_3 may constitute a virtual cluster CL and the client 100 may recognize and use the virtual machines VM_1, VM_2, and VM_3 as one virtual machine.

In detail, referring to FIG. 4, the system for providing a data analysis service in a cloud environment according to the embodiment may include a virtual cluster manager 150, a user storage manager 160, and a user analysis resource manager 170.

The virtual cluster manager 150 may cluster the virtual machines VM_1, VM_2, and VM_3 together, as described above.

The virtual cluster manager 150 may form the virtual machine VM_1, VM_2, and VM_3 in a cluster, when using cloud resources particularly on a big data analysis service system. Accordingly, it is possible to provide a function that can generate virtual machines and then construct and manage storage solutions and analysis solutions in clusters, using the virtual machines.

The user storage manager 160 may manage the information on a plurality of storages 120_1, 120_2, and 120_3 included in the virtual machines VM_1, VM_2, and VM_3. That is, the storage node 130 manages in person data input/output to the storage 120 and may manage overall information on the storages 120_1, 120_2, and 120_3, for example, the usage to available capacity, the occupancy rate, the distribution, and the number of articles for each user, each virtual machine, or each physical machine. Further, the user storage manager 160 may make the storage node 130 do a corresponding work by transmitting an instruction such as expansion or change of the storage 120 to the storage node 130.

When a user requests a new storage 120 to store data through the client 100 device, the user's private storage 120 is constructed from cloud resources by the cloud resource manager 140 and then a service that allows the user to manage the generated storage 120 through the user storage manager 160 may be provided.

Referring to FIG. 5, the user analysis resource manager 170 may generate another virtual machine VM_4 including an analysis node 180_1 for analyzing the data stored in the virtual machines VM_1, VM_2, and VM_3.

The user may use the virtual machines VM_1, VM_2, and VM_3 on the cloud 200 as the storage 120 on a network through the client 100 device, and may request the cloud 200 system to provide a data analysis service in order for the user to analyze the data stored in the storage 120. Further, when the user requests a data analysis service, it is possible to construct the requested analysis system only for the user by generating the virtual machine VM_4 for data analysis at the most efficient place in consideration of the position of the user's storage 120 on the system on the existing cloud 200.

The user, thereafter, may use and manage the generated analysis system through the user analysis resource manager 170.

For example, when a user determines the desired analysis solution and the size through the user analysis resource manager 170 and makes a request for the analysis solution and the size to the cloud 200 system, the virtual cluster manager 150 generates the virtual machine VM_4 including the analysis node 180_1 in which an analysis solution is driven, into a cluster, using the cloud resource manager 140. The virtual machine VM_4 for analysis may have several analysis solution clusters in accordance the object of each of users through the user analysis resource manager 170 and may be managed for each of the users.

Referring to FIG. 6, the virtual machine VM_4 for analysis generated as described above may access the storage 120 and perform predetermined calculation for analyzing the corresponding data.

The virtual machines VM_1, VM_2, and VM_3 for storages are assigned with large disk capacity, but small CPU and memory capacity, whereas the virtual machine VM_4 for analysis may be assigned with relatively small disk capacity, but large CPU and memory capacity.

That is, as for the virtual machines VM_1, VM_2, and VM_3 for storages, virtual disks are frequently inputted/outputted because data is repeatedly read and written, whereas a little amount of the CPU or the memory may be used because simply data is moved. Therefore, efficient management of resources may be achieved by assigning a relatively large disk resource and a small CPU or memory resource in the cloud resource manager 140, when generating the virtual machines VM_1, VM_2, and VM_3 for storages.

In contrast, as for the virtual machine VM_4 for analysis, the disk usage is small, whereas predetermined calculation is repeated by the CPU after data, particularly, big data is loaded on the memory, such that efficient management of resources can be achieved by assigning a relatively small disk resource and a large CPU or memory resource, when generating the virtual machine VM_4 for analysis in the user analysis resource manager 170 through the cloud resource manager 140.

As described above, since the virtual machine VM_4 for analysis including the analysis node 180_1 is generated in the cloud 200 environment, the same as the virtual machines VM_1, VM_2, and VM_3 for storages, it is not needed to specifically move the big data included in the virtual machines VM_1, VM_2, and VM_3 for storages, which is considerable in the entire data analysis time, to the virtual machine VM_4 for analysis, and the data may be rapidly analyzed.

That is, while the virtual machine VM_4 for analysis performs data analysis, the data may be kept in the virtual machines VM_1, VM_2, and VM_3 for storages.

Further, because it is possible to determine the arrangement of the virtual machine VM_4 for analysis in consideration of accessibility to the virtual machines VM_1, VM_2, and VM_3 for storages, when generating the virtual machine VM_4 for analysis including the analysis node 180_1, it is possible to reduce data accessibility and analysis time.

The clustered virtual machines VM_1, VM_2, and VM_3 for storages may be assigned to a specific user and the data stored in the clustered virtual machines VM_1, VM_2, and VM_3 for storages may be big data of GB or more.

The virtual cluster manager 150 may reconstruct a new virtual cluster by putting the additionally generated virtual machine VM_4 for analysis into the virtual machines VM_1, VM_2, and VM_3 for storages included in an existing virtual cluster.

In this specification, the virtual machines VM_1, VM_2, and VM_3 for storages may be a plurality of first virtual machines and the virtual machine(s) VM_4 for analysis may be a plurality of second virtual machines.

Figure 7:
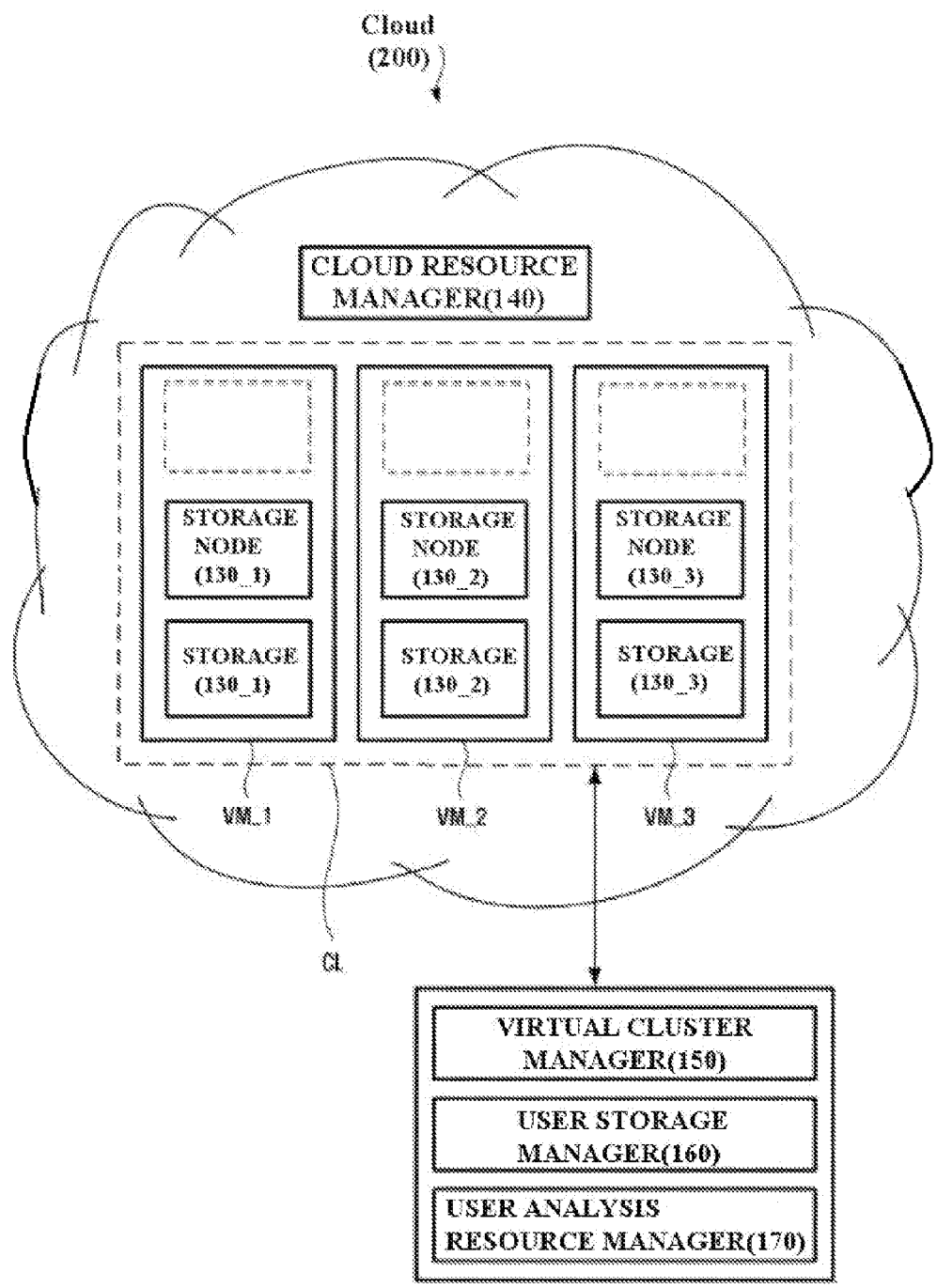
FIG. 7 is a block diagram illustrating a system for providing a data analysis service in a cloud environment according to another embodiment of the present invention.

Hereinafter, a system for providing a data analysis service in a cloud environment according to another embodiment of the present invention will be described with reference to FIGS. 7 to 9. FIG. 7 is a block diagram illustrating a system for providing a data analysis service in a cloud environment according to another embodiment of the present invention, FIG. 8 is a diagram illustrating a configuration for analyzing data in the cloud environment of FIG. 7, and FIG. 9 is a diagram illustrating a configuration for scaling up a virtual machine before performing the data analysis of FIG. 8.

Figure 8:
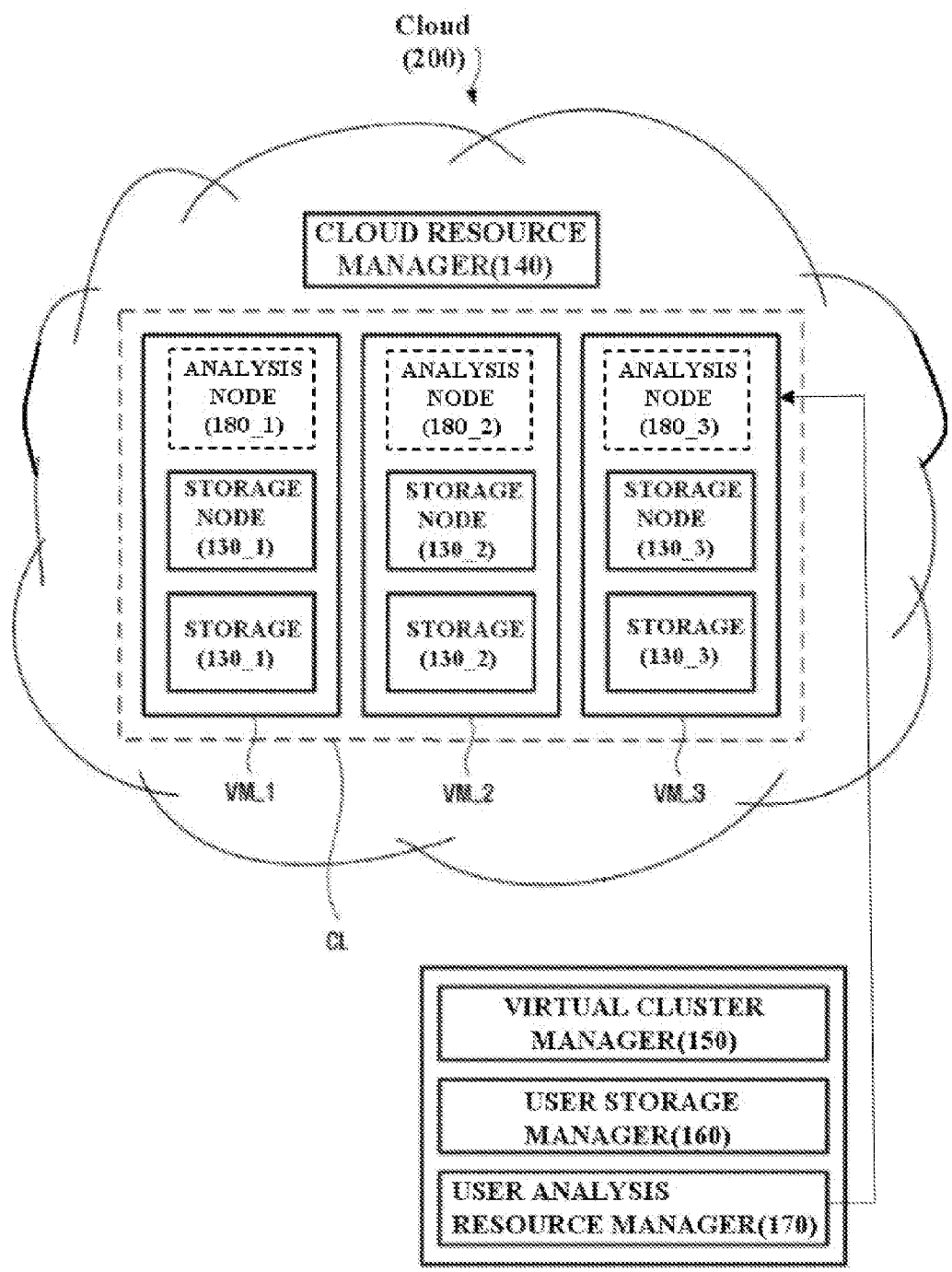
FIG. 8 is a diagram illustrating a configuration for analyzing data in the cloud environment of FIG. 7.
Figure 9:
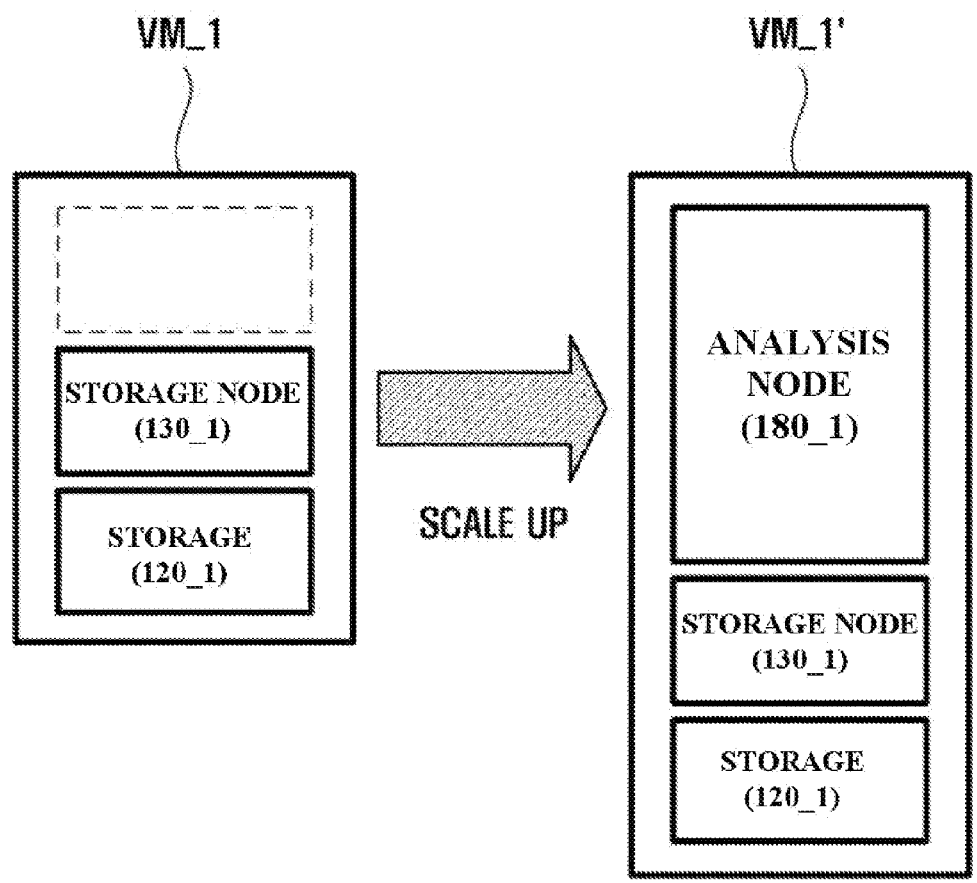
FIG. 9 is a diagram illustrating a configuration for scaling up a virtual machine before performing the data analysis of FIG. 8.

Referring to FIGS. 7 and 8, a system for providing a data analysis service in a cloud environment according to another embodiment of the present invention includes: a plurality of first virtual machines VM_1, VM_2, and VM_3 generated from cloud resources and including a storage 120 storing data and a storage node 130 managing input/output of the data in the storage 120; a virtual cluster manager 150 clustering the first virtual machines VM_1, VM_2, and VM_3 together; a user storage manager 160 managing the information on the storage 120; a cloud resource manager 140 managing the cloud resources; and a user analysis resource manager 170 generating an analysis node 180 for analyzing the data stored in the first virtual machines VM_1, VM_2, and VM_3, when receiving a data analysis request from the user of the first virtual machines VM_1, VM_2, and VM_3 in the first virtual machines VM_1, VM_2, and VM_3, in which the analysis node 180 accesses and analyzes the data and the cloud resource manager 140 scales up the entire available resource of some of the first virtual machines VM_1, VM_2, and VM_3, before the analysis node 180 is generated in the first virtual machines VM_1, VM_2, and VM_3.

That is, unlike the previous embodiment, when a user requests an analysis service for the data stored in the storage 120, a specific virtual machine for analysis is not generated, but the analysis node 180 can be directly generated in the existing virtual machines VM_1, VM_2, and VM_3.

Accordingly, it is not needed to generate a specific virtual machine for analysis when performing analysis, and thus the work time and the resources can be reduced. The analysis nodes 180 generated in the virtual machines VM_1, VM_2, and VM_3 can access the storages 120 in the same virtual machine or other virtual machines and analyze the data, and provide the analysis result to the client 100 device.

Referring to FIG. 9, scale-up that increases the resources by assigning additional resources to the corresponding virtual machines VM_1, VM_2, and VM_3 through the cloud resource manager 140 can be performed in advance before the analysis node 180 is generated in the virtual machines VM_1, VM_2, and VM_3.

As described above, for the virtual machines VM_1, VM_2, and VM_3 for storages, since the data is repeatedly read and written, a virtual disk is frequently inputted/outputted, whereas the data is usually simply moved, such that a relatively large disk resource is assigned and a small CPU or memory resource is assigned in the cloud resource manager 140, when the virtual machines VM_1, VM_2, and VM_3 for storages are generated.

Therefore, it is possible to manage the virtual machines VM_1, VM_2, and VM_3 for smooth analysis by assigning with an additional resource such as the CPU and/or memory resource in advance through the cloud resource manager 140, before generating the analysis node 180 requiring a large amount of CPU and/or memory resources in the virtual machines VM_1, VM_2, and VM_3 generated for storages.

Some of the resources may include an available CPU and an available memory.

The user analysis resource manager 170 is assigned with a resource through the cloud resource manager 140 and generates the analysis node 180, in which the network traffic and/or the size of the storage may be constantly maintained.

The virtual machines VM_1, VM_2, and VM_3 divisionally store data, for example, some of the big data and some of the data may be repeatedly stored in some of the virtual machines VM_1, VM_2, and VM_3.

That is, when there is a malfunction of a specific virtual machine, the same data can be repeatedly stored in different virtual machines VM_1, VM_2, and VM_3 to ensure safety and availability. For example, under the 3-replication policy, the first virtual machine VM_1, the second virtual machine VM_2, and the third virtual machine VM_3 can store the same data, but the storage number of the repeated data may depend on the setting.

The cloud resource manager 140 can sequentially reboot some first virtual machines when increasing the resources of some of the virtual machines VM_1, VM_2, and VM_3. In order to perform scale-up that increases the resource of the virtual machine that is being driven, it is required to reboot the virtual machine, in which accessibility to the virtual machine for the user can be intactly kept, for example, by sequentially rebooting the virtual machines storing different portions of data or sequentially rebooting three virtual machines storing the same data.

Figure 10:
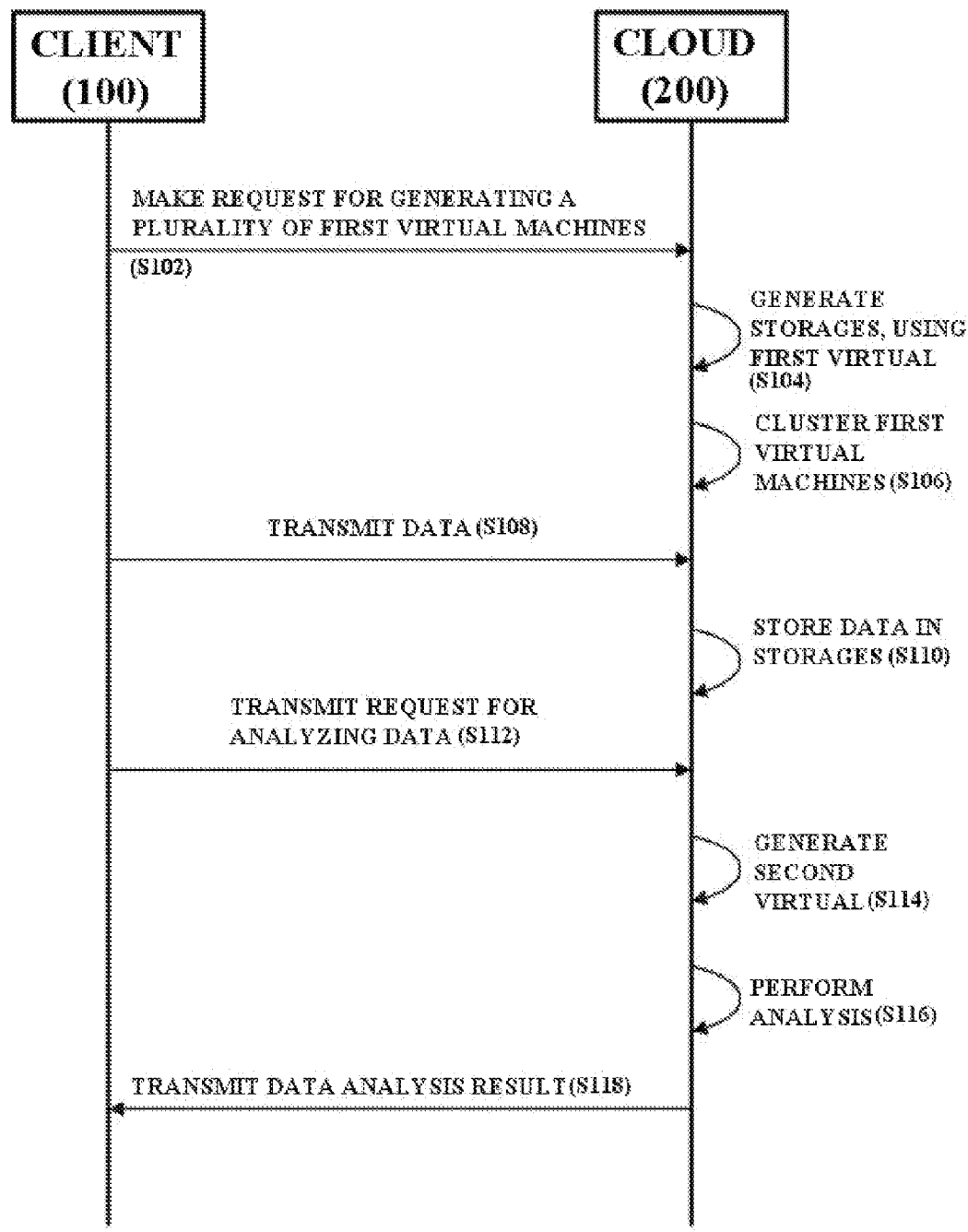
FIG. 10 is a diagram illustrating a method of providing a data analysis service in a cloud environment according to an embodiment of the present invention.

Hereinafter, a method of providing a data analysis service in a cloud environment according to an embodiment of the present invention will be described with reference to FIG. 10.

A method of providing a data analysis service in a cloud environment according to the embodiment includes: receiving a request for generating a plurality of first virtual machines from a user (S102); generating a storage by using the first virtual machines (S104); clustering the first virtual machines together (S106); storing data received from the user to the storage (S108 and S110); receiving a request for analyzing the data (S112); generating a second virtual machine including an analysis node for analyzing the data (S114); and accessing and analyzing the data by means of the second virtual machine (S116).

First, a request for generating a first virtual machine is transmitted to the cloud 200 system from the client 100 device (S102). The specification type for the virtual machine may be set in advance or may be set freely by a user. The user can transmit a request for generating one or more virtual machines at a time.

The user can transmit a request for generating virtual machines such that the virtual machines have different specifications in accordance with functions of the virtual machines. For example, for a virtual machine for a storage, it is possible to set the capacity of the disk large and assign a small amount for the CPU and/or the memory.

The cloud 200 server or system receiving the generating request can generate one or more virtual machines and configure a storage, using the virtual machines (S104). However, it is possible to configure a virtual machine for analysis, not a storage, in accordance with the specification of the virtual machine.

Next, when a plurality of virtual machines is generated for one user, a virtual cluster is generated by clustering the virtual machines together (S106). The user can use the virtual machines in a cluster and the virtual machines can be handled as one machine.

All of the virtual machines for storages clustered together may be assigned to one user.

Next, data can be transmitted to the virtual machines in the cloud 200 from the client 100 (S108). The type of the data is not limited and the data may be, for example, big data of GB or more.

The virtual machine receiving the data can store and manage the data in the storage (S110). The user having the authority of managing the corresponding virtual machine can freely record and delete the data in the storage and may migrate the data between virtual machines or physical machines in which virtual machines are generated and driven.

Next, when a request for analyzing data is received from the client 100 (S112), it is possible to generate a virtual machine for analysis including an analysis node where an analysis solution is installed (S114) and the virtual machine for analysis can perform analysis (S116).

The virtual machine for analysis may be generated in a specific instance, different from the virtual machine for a storage and may have a specification different from that of the virtual machine for a storage. For example, the disk capacity of the virtual machine for analysis may be set small relative to the virtual machine for a storage, whereas the capacity of the CPU and/or the memory may be set large relative to the virtual machine for a storage.

It is possible to improve the access speed by generating the virtual machine for analysis close to the virtual machine for a storage.

When the analysis of the data is finished, the analysis result may be transmitted from the cloud 200 system to the client 100 device (S118). In some other embodiments, the analysis result may be stored in a virtual machine in the cloud 200, for example, in the virtual machine for a storage.

The virtual machine for analysis and the virtual machine for a storage may be generated in the same cloud 200 environment, and data may be kept in the virtual machine for a storage in the step of performing analysis.

Figure 11:
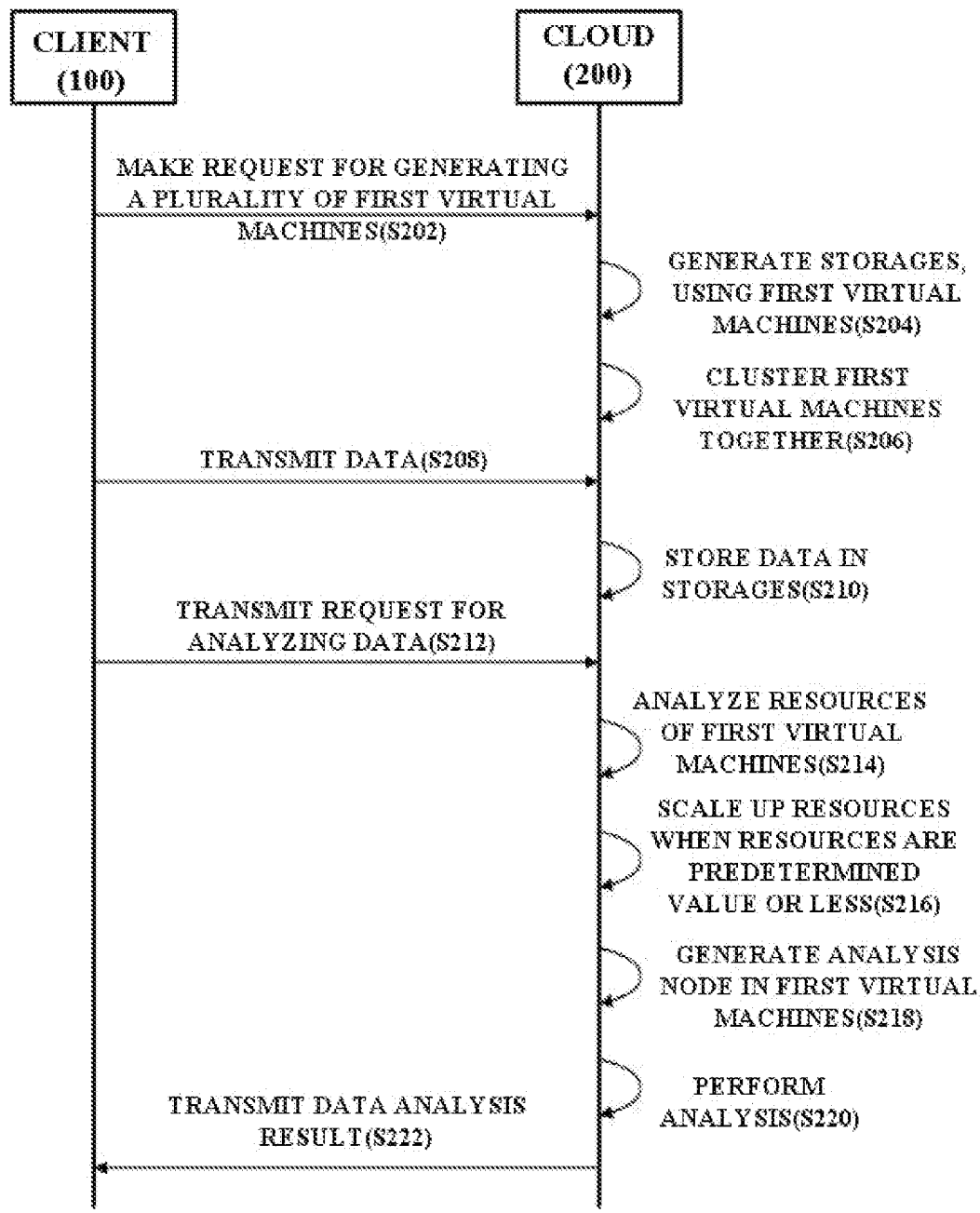
FIG. 11 is a diagram illustrating a method of providing a data analysis service in a cloud environment according to another embodiment of the present invention.

Hereinafter, a method of providing a data analysis service in a cloud environment according to another embodiment of the present invention will be described with reference to FIG. 11.

A method of providing a data analysis service in a cloud environment according to the embodiment includes: receiving a request for generating a plurality of first virtual machines from a user (S202); generating a storage by using the first virtual machines (S204); clustering the first virtual machines together (S206); storing data received from the user to the storage (S208 and S210); receiving a request for analyzing the data (S212); analyzing the resources of the first virtual machines (S214); scaling up the resources of the first virtual machine, when the resources are at a predetermined value or less (S216); generating an analysis node for analyzing the data in the first virtual machines (S218); and accessing and analyzing the data by means of the analysis node (S220).

The method of providing a data analysis service in a cloud environment according to the embodiment is the same as those of the previous embodiments, except that a virtual machine for analysis is not separately generated and the analysis node is generated in the existing virtual machine for a storage. Further, there is a difference in that the scale-up process of increasing the resource of the virtual machine for a storage is performed before the analysis node is generated.

The scaled-up resource may include an available CPU and an available memory, and the network traffic or the size of the storage may be constantly maintained, when the analysis node is generated in an existing virtual machine.

Further, as described above, in the storing of data in a storage to prevent loss of the data, some of the data may be divisionally stored in a plurality of virtual machines or the same data may be repeatedly stored in a plurality of virtual machines.

Further, the method may include rebooting sequentially some virtual machines, when increasing the resource so that the scale-up setting can be applied to the virtual machines.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A system for providing a data analysis service in a cloud environment, the system comprising:
   a plurality of first virtual machines configured to be generated from cloud resources and including a corresponding storage configured to store data and a storage node managing input and output of the data for the corresponding storage;
   a virtual cluster manager configured to cluster the plurality of first virtual machines together;
   a user storage manager configured to manage information on the corresponding storage;
   a cloud resource manager configured to manage the cloud resources; and
   a user analysis resource manager configured to generate a second virtual machine comprising an analysis node for analyzing the data stored in the first virtual machines clustered together, in response to a request for analyzing data from a user of the first virtual machines,
   wherein the second virtual machine accesses and analyzes the data,
   wherein the cloud resource manager scales-up some resources in the plurality of first virtual machines,
   wherein the plurality of first virtual machines are configured to divisionally store some of the data and the some of the data is repeatedly stored in some of the plurality of first virtual machines, and
   wherein the cloud resource manager is configured to sequentially reboot the some of the plurality of first virtual machines when the some of the resources of the plurality of first virtual machines are scaled up.

2. The system of claim 1, wherein the plurality of first virtual machines and the second virtual machine are configured to be generated in the same cloud environment.

3. The system of claim 1, wherein the data is configured to be kept in the plurality of first virtual machines while the second virtual machine performs the analysis.

4. The system of claim 1, wherein the plurality of first virtual machines clustered together are configured to be assigned to a specific user.

5. A system for providing a data analysis service in a cloud environment, the system comprising:
a plurality of first virtual machines configured to be generated from cloud resources and including a corresponding storage configured to store data and a storage node managing input and output of the data for the corresponding storage;
a virtual cluster manager configured to cluster the plurality of first virtual machines together;
a user storage manager configured to manage information on the corresponding storage;
a cloud resource manager configured to manage the cloud resources; and
a user analysis resource manager configured to generate, in the plurality of first virtual machines, an analysis node for analyzing the data stored in the plurality of first virtual machines clustered together, in response to a request for analyzing data from a user of the plurality of first virtual machines,
wherein the analysis node accesses and analyzes the data, and the cloud resource manager scales-up some resources in the plurality of first virtual machines prior to the analysis node being generated in the plurality of first virtual machines,
wherein the plurality of first virtual machines are configured to divisionally store some of the data and the some of the data is repeatedly stored in some of the plurality of first virtual machines, and
wherein the cloud resource manager is configured to sequentially reboot the some of the plurality of first virtual machines when the some of the resources of the plurality of first virtual machines are scaled up.

6. The system of claim 5, wherein the some resources include an available CPU and an available memory.

7. The system of claim 5, wherein a network traffic or a size of the corresponding storage is configured to be constantly maintained when the cloud resource manager generates the analysis node.

8. A method of providing a data analysis service in a cloud environment, the method comprising:
receiving from a user a request for generating a plurality of first virtual machines;
generating a corresponding storage by using the plurality of first virtual machines;
clustering the plurality of first virtual machines together;
storing data received from the user to the corresponding storage;
receiving a request for analyzing the data;
scaling up resources of the plurality of first virtual machines when the resources are at a predetermined value or less;
generating a second virtual machine which includes an analysis node to analyze the data stored in the plurality of first virtual machines clustered together; and
accessing and analyzing the data by the second virtual machine,
wherein the storing of data in a corresponding storage divisionally stores some of the data in the plurality of first virtual machines and the some of the data is repeatedly stored in some of the plurality of first virtual machines, and
wherein the scale-up of the resources includes sequentially rebooting the some of the plurality of first virtual machines.

9. The method of claim 8, wherein the plurality of first virtual machines and the second virtual machine are generated in the same cloud environment.

10. The method of claim 8, wherein in the performing of analysis, the data is kept in the plurality of first virtual machines.

11. The method of claim 8, wherein all of the plurality of first virtual machines clustered together are assigned to the user.

12. A method of providing a data analysis service in a cloud environment, the method comprising:
receiving from a user a request for generating a plurality of virtual machines;
generating a corresponding storage by using the first virtual machines;
clustering the plurality of first virtual machines together;
storing data received from the user to the corresponding storage;
receiving a request for analyzing the data;
analyzing the resources of the plurality of first virtual machines;
scaling up the resources of the plurality of first virtual machines, when the resources are at a predetermined value or less;
generating an analysis node to analyze the data in the plurality of first virtual machines clustered together; and
accessing and analyzing the data by the analysis node,
wherein the storing of data in a corresponding storage divisionally stores some of the data in the plurality of first virtual machines and the some of the data is repeatedly stored in some of the plurality of first virtual machines, and
wherein the scale-up of the resources includes sequentially rebooting the some of the plurality of first virtual machines.

13. The method of claim 12, wherein the resources include an available CPU and an available memory.

14. The method of claim 12, wherein in the generating of an analysis node in the plurality of first virtual machines, a network traffic or a size of the storage is constantly maintained.

15. A system for providing a data analysis service in a cloud environment, the system comprising:
a plurality of first virtual machines configured to be generated from cloud resources and including a corresponding storage node managing input and output of the data;
a user analysis resource manager configured to generate a second virtual machine including an analysis node for analyzing data stored in the plurality of first virtual machines clustered together, in response to a request for analyzing data from a user of the plurality of first virtual machines; and
a cloud resource manager configured to manage the cloud resources,
wherein the second virtual machine accesses and analyzes the data,
wherein the cloud resource manager scales-up some resources in the plurality of first virtual machines,
wherein the plurality of first virtual machines are configured to divisionally store some of the data and the some of the data is repeatedly stored in some of the plurality of first virtual machines, and
wherein the cloud resource manager is configured to sequentially reboot the some of the plurality of first virtual machines when the some of the resources of the plurality of first virtual machines are scaled up.

16. The system for providing a data analysis service in a cloud environment of claim 15, wherein the plurality of first virtual machines include a storage configured to store data, and wherein the corresponding storage node manager is configured to input and output the data for the storage.

17. The system for providing a data analysis service in a cloud environment of claim 15, further including a virtual cluster manager configured to cluster the plurality of first virtual machines together.

18. The system for providing a data analysis service in a cloud environment of claim 15, further including a user storage manager that manages the information on the storage.

19. The system for providing a data analysis service in a cloud environment of claim 15, wherein the plurality of first virtual machines and the second virtual machine are generated in the same cloud environment.

\* \* \* \* \*